Patented Jan. 11, 1927.

1,613,786

UNITED STATES PATENT OFFICE.

DONALD F. BROWN AND FREDERICK J. RAYMER, OF LONDON, ENGLAND, ASSIGNORS, BY MESNE ASSIGNMENTS, TO THE UNION SWITCH & SIGNAL COMPANY, OF SWISSVALE, PENNSYLVANIA, A CORPORATION OF PENNSYLVANIA.

CONTROLLING APPARATUS FOR COLLIERIES.

Application filed September 23, 1925, Serial No. 58,103, and in Great Britain August 14, 1923.

Our invention relates to controlling apparatus for collieries of the type comprising a hoisting cage adapted to convey both men and material from the top to the bottom of a shaft or vice-versa. Collieries of this type usually comprise decking mechanism, controlled by manually operable levers, and located at the pit top and the pit bottom for co-operating with the hoisting cage.

One object of our present invention is the provision of one lever for controlling the decking mechanism when the hoisting cage is conveying men, and another lever or levers for controlling the decking mechanism when the cage is conveying material.

A further object of our invention is to interlock these separate levers so that the operation of any lever will prevent operation of any remaining lever which would cause unsafe functioning of the mechanism or cage while the first lever is in its operated position.

The present case is a continuation in part of our co-pending application, Serial No. 693,407, filed Feb. 16, 1924, for hoisting plant for collieries and the like, in so far as the subject matter common to the two is concerned.

We will describe one form of controlling apparatus embodying our invention, and will then point out the novel features thereof in claims.

Figure 1:
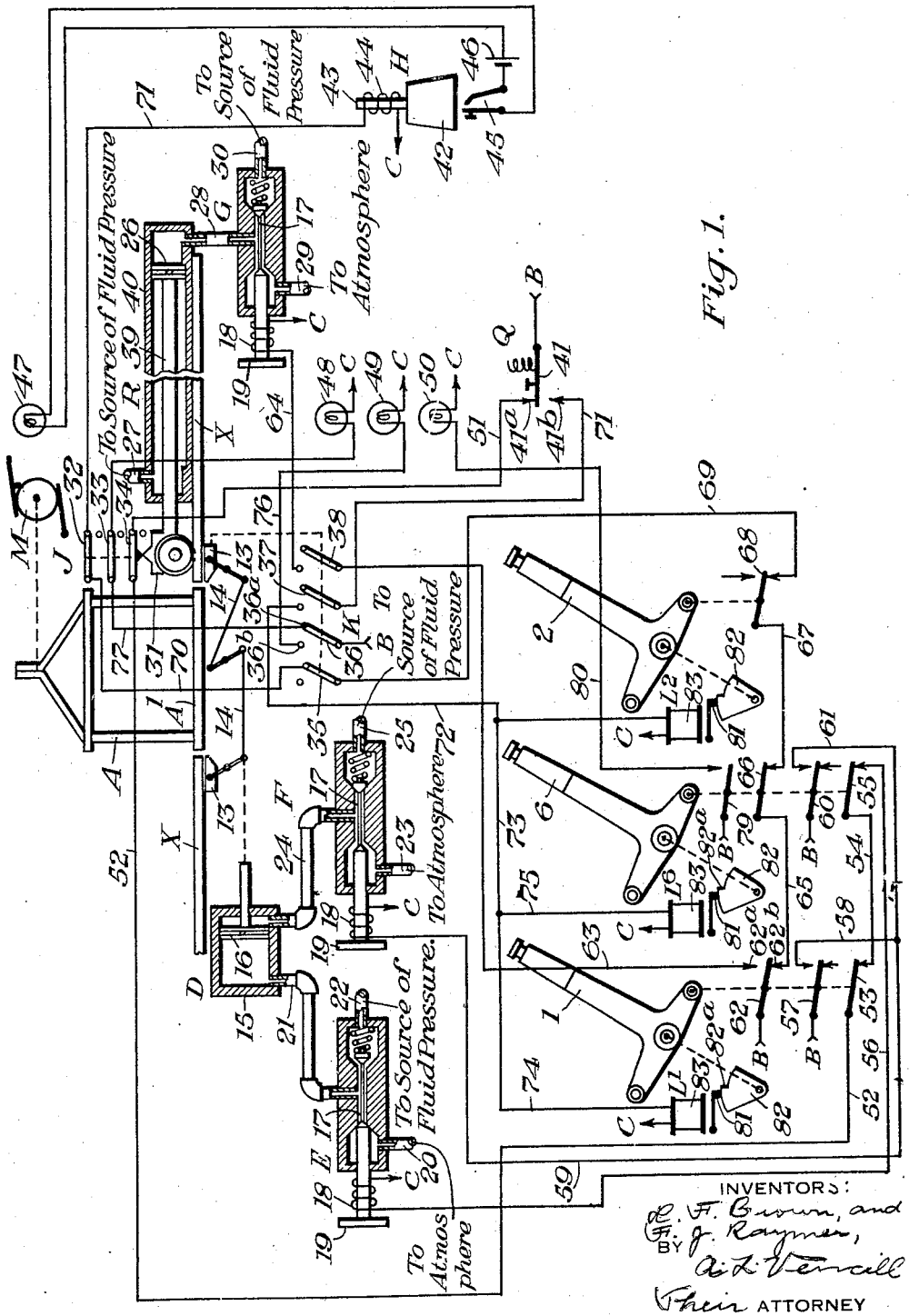
Figure 3:
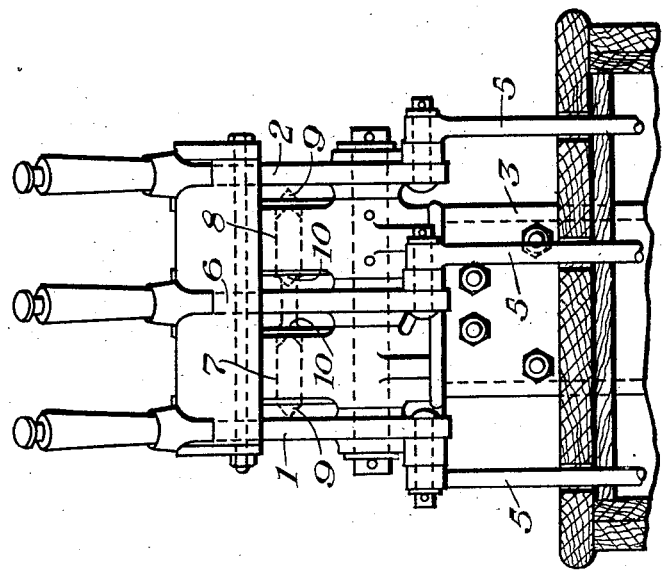
Figure 2:
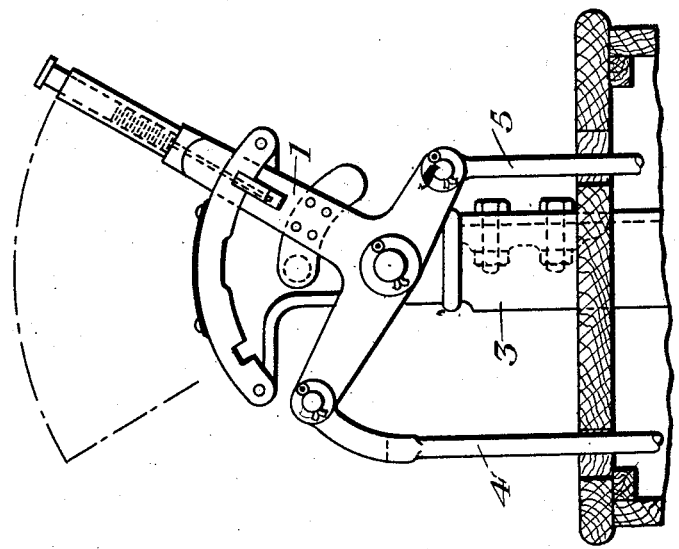

In the accompanying drawings, Fig. 1 is a view, partly diagrammatic, showing the general arrangement of the decking mechanism located at the pit top. Fig. 2 is a view showing, in side elevation, a portion of the lever machine for controlling the apparatus illustrated in Fig. 1. Fig. 3 is a view showing, in rear elevation, the lever machine illustrated in Fig. 2.

Similar reference characters refer to similar parts in each of the several views.

Referring first to Fig. 1 the reference character A designates a hoisting cage which is arranged to operate in the colliery shaft between the pit top and the pit bottom. The cage is driven by a motor M which is controlled by an engineman through means omitted from the drawing for the sake of simplicity.

As shown in the drawing the cage A is located at the pit top. In order to lock the cage in the position shown in the drawing, that is, with the deck A' of the cage in line with the plant deck X at the pit top, a number of keps indicated at 13 are provided. These keps are arranged to be placed in position under the cage A, or to be withdrawn therefrom, by means of a pneumatically operated motor D operating the keps through the linkwork 14. The motor D comprises a cylinder 15 containing a reciprocable piston 16. This cylinder 15 is at times supplied with fluid pressure, usually air, through electro-pneumatic valves E and F.

Referring particularly to valve E, this valve comprises a valve stem 17 carrying an armature 19. Associated with the armature 19 is a winding 18. When winding 18 is energized stem 17 is moved to the right and fluid pressure is then supplied from a suitable source not shown in the drawing through pipe 22, valve E and pipe 21 to cylinder 15 on the left-hand side of piston 16, driving this piston to the right. The piston is operatively connected with the linkwork 14 operating the keps 13, and when the piston is in its right-hand position the keps 13 are withdrawn out of engagement with the cage A. When winding 18 of valve E in de-energized, valve stem 17 moves to the left under the influence of its spring, so that it disconnects pipe 21 from the supply fluid pressure and connects this pipe with atmosphere through port 20. The construction of valve F is similar to that of valve E and it will therefore be seen that when winding 18 of the valve F is energized fluid pressure is supplied from pipe 25 through valve F and pipe 24 to cylinder 15 of the motor D on the right-hand side of piston 16, thereby driving piston 16 to the left. This motion of the piston is transmitted to the keps 13 and moves the keps under the cage A, thereby locking the cage in its proper position at the plant deck. With the keps in this projected, or locking position, it is impossible for the engineman to lower the hoisting cage. When winding 18 of the valve F is deenergized stem 17 returns to its left hand position and connects pipe 24 with atmosphere.

Associated with the keps 13 is a circuit controller designated by the reference character K. This circuit controller comprises a number of contacts which are controlled in accordance with the positions occupied by the keps. When the keps are withdrawn, as shown in the drawing, contacts 35 and 36—36$^a$ are closed, but when the keps are projected into their locking positions the contacts just named are opened and contacts 36—36$^b$, 37 and 38 are closed.

In addition to the locking mechanism for the cage, here illustrated by the keps 13, the controlling apparatus comprises material handling mechanism. For purposes of the present application we have illustrated this mechanism as a ram R but the mechanism for handling material on the hoisting cage may be of a more elaborate nature, such for example as the mechanism illustrated in United States Letters Patent No. 1,508,921, granted Sept. 16, 1924, to Frank M. Castleman, for loading and unloading gears for hoisting plants.

In the present application the ram R comprises an elongated cylinder 40 containing a piston 26 to which is attached a plunger 39. The left hand end of the plunger 39 terminates in a ram head 31 outside of the cylinder 40. Fluid pressure is constantly supplied to cylinder 40 on the left-hand side of piston 26 through pipe 27. Fluid pressure is at times supplied also to this cylinder on the right-hand side of the piston 26 through a valve G similar to valves E and F. When winding 18 of this valve is de-energized the cylinder 40 on the right-hand side of piston 26 is connected with atmosphere through pipe 28, valve G, and port 29. The pressure on the left-hand side of piston 26 therefore moves the piston to the right carrying with it the plunger 39 and the ram head 31. When winding 18 of valve G is energized, however, fluid pressure is supplied from pipe 30, through valve G and pipe 28 to cylinder 40 on the right-hand side of piston 26. The area on which this pressure is effective upon piston 26 is greater than the area upon which the pressure from pipe 27 is effective upon the left-hand side of this piston because of the plunger 39 and the piston is therefore moved to the left carrying with it the plunger 39 and the ram head 31. The ram R is so located that when the ram head 31 is retracted, it is clear of the hoisting cage A, but that when this ram head is projected it extends into the cage A to push from this cage the tubs or cars which are customarily used to transport material in collieries.

Associated with the ram R is a circuit controller J comprising three contacts 32, 33 and 34 which are arranged to be closed only when the ram head 31 is in its fully retracted position.

The decking mechanism thus far described is controlled through the medium of a lever machine comprising three levers 1, 6 and 2. This lever machine is under the control of an operator located at the pit top and usually designated as the banksman. Levers 1 and 2 are known as decking levers. The lever 1 controls the decking operation of the hoisting cage A when conveying material. Lever 2 is provided in the lever machine for the control of decking mechanism not shown in the drawing but associated with a second cage similar to cage A, which, in some collieries, is installed beside the cage A and operated on the same supporting cable so that the two cages partially counterbalance each other.

Referring to Figs. 2 and 3, the levers 1 and 2 are mounted in a frame 3 and each lever controls a locking segment and a plurality of contacts. (See Fig. 1.) In actual practice the locking segment will usually be controlled by the rod 4 and the contact mechanism by the rod 5. The operation of these contacts and locking segments will be described in detail hereinafter. Mounted co-axially with the levers 1 and 2 is the additional lever 6 which is interlocked with the levers 1 and 2 by means of a tappet mechanism. This mechanism comprises a pair of tappets 7 and 8 capable of horizontal movement within suitable guides in the upper portion of the frame 3, in such manner that when the additional lever 6 is moved from its normal position, in which it is illustrated in the drawing, to its reverse or operative position, the lever 6 displaces the tappets 7 and 8 outwardly and causes them to engage with suitable notches or recesses 9 in the decking levers 1 and 2 so as to lock these levers in their normal or inoperative positions. Conversely, when either lever 1 or 2 is moved from its normal position to its reverse position the tappet 7 or 8 engages with a notch 10 in the lever 6 and prevents this lever from being moved from its normal to its reverse position.

Associated with each lever of the machine is an electric lock designated by the reference character L with an exponent corresponding to the associated lever. Referring particularly to the lock L', this lock comprises a pivoted segment 82 operatively connected with the lever 1 and arranged to be swung in a counter-clockwise direction when the lever 1 is moved from its normal position, in which it is illustrated in the drawing, to its reverse position. A locking dog 81, controlled by a magnet 83, is so disposed as to engage the edge of the segment 82 when magnet 83 is deenergized. It will be plain from the drawing that the lock L' does not interfere with motion of lever 1 from the normal to the reverse position, but that in order to return the lever to its normal position from its reverse position, magnet 83 of the lock L' must be energized to lift the dog 81 clear of the shoulder 82$^a$ of segment 82. The remaining electric locks L$^6$ and L$^2$ are similar to the electric lock L'. The electric circuits for controlling the magnets 83 of the several electric locks will be described in detail hereinafter.

Associated with each of the levers is a group of contacts controlled in accordance with the position occupied by the lever. For example, when lever I is in the normal position, normal contacts 53 and 62—62<sup>b</sup> are closed, but when the lever is in the reverse position, reverse contacts 57 and 62—62<sup>a</sup> are closed and the normal contacts named above are open. The remaining levers are provided with similar contacts.

In addition to the three levers 1, 6 and 2, the banksman has under his control a manually operable circuit controller Q. Contact 41—41<sup>a</sup>, of this circuit controller is normally closed, but when the banksman operates the circuit controller, contact 41—41<sup>a</sup> is opened and contact 41—41<sup>b</sup> is closed. We will explain the purpose of this circuit controller hereinafter.

The banksman is also provided with a blinder device H comprising a normally open push button 45 which is included in a circuit with a source of energy, such as a battery 46, and an indicator, here shown as an electric lamp 47. Lamp 47 is so located as to be visible to the engineman who operates the hoisting motor M. It follows, therefore, that by manipulation of the push button 45, the banksman can signal the engineman and can therefore direct the movements of the cage by communicating orders to the engineman through the medium of the lamp 47. Associated with push button 45 is a shield 42 provided with an upstanding magnetizable stem 43. The stem 43 is provided with a winding 44. When winding 44 is energized shield 42 is lifted upwardly so as to expose push button 45. When winding 44 is de-energized, however, shield 42 drops under the influence of gravity, and covers push button 45. The banksman cannot, therefore, manipulate push button 45 to signal the engineman unless winding 44 is energized.

The valves E, F and G and the winding 44 of the blinder device H are controlled by the levers 1, 6 and 2, as will now be explained. The circuit for valve E may be traced from terminal B of a suitable source of energy not shown in the drawing, through contact 41—41<sup>a</sup> of circuit controller Q, wire 51, contact 34 of circuit controller J, wire 52, normal contact 53 of lever 1, wire 54, normal contact 55 of lever 6, wire 56, and winding 18 of valve E to terminal C of the same source. Valve E is therefore operated to withdraw the keps 13 only when levers 1 and 6 are in their normal positions and when the circuit controller Q is released and the ram R is in its fully retracted position. Valve F, which when open, causes the keps 13 to be projected into locking position, is provided with two circuits. One circuit passes from terminal B, through reverse contact 57 of lever 1, wires 58 and 59, and winding 18 of valve F to terminal C. This circuit is closed when lever 1 is reversed. Another circuit may be traced from terminal B, through reverse contact 60 of lever 6, wires 61 and 59, and winding 18 of valve F to terminal C. This circuit is closed when lever 6 is reversed. It follows that valve F is open, and that the keps are therefore projected into their locking positions, when either of levers 1 or 6 is moved to its reverse position.

The ram controlling valve G is provided with a circuit which may be traced from terminal B, through reverse contact 62—62<sup>a</sup> of lever 1, wire 63, contact 38 of circuit controller K, wire 64, and winding 18 of valve G to terminal C. We have already explained that contact 38 is closed only when the keps are in their locking positions and it follows that winding 18 of valve G is energized only when lever 1 is reversed and when the keps are actually in their locking positions.

When levers 1, 6 and 2 are all in their normal positions and when the keps are withdrawn and the ram is fully retracted, current flows from terminal B, through normal contact 62—62<sup>b</sup> of lever 1, wire 65, normal contact 66 of lever 6, wire 67, normal contact 68 of lever 2, wire 69, contact 35 of circuit controller K, wire 70, contact 32 of circuit controller J, wire 71, and winding 44 of blinder device H to terminal C. When this circuit is closed the shield 42 is lifted to permit the banksman to operate push button 45.

As shown in the drawing all of the levers 1, 6 and 2 are in their normal positions and circuit controller Q is released. Valve E is therefore open, its circuit being complete over normal contacts 53 of lever 1, and 55 of lever 6. The keps are therefore withdrawn. Valve G is de-energized, its circuit being open at contact 38 of circuit controller K and also at reverse contact 62—62<sup>a</sup> of lever 1, now open. The ram is therefore in its fully retracted position and winding 44 of the blinder device H is energized.

In explaining the operation of the apparatus we will first assume that the hoisting cage A is conveying material. When the cage has reached the upper level in which it is illustrated in the drawings the banksman reverses lever 1. Winding 44 of device H is deenergized, its circuit being open at normal contact 62—62<sup>b</sup> of lever 1. The closing of reverse contact 57 of lever 1 completes a circuit for magnet F. Magnet E was de-energized by the opening of normal contact 53 of lever 1 and so cylinder 15 on the left hand side of piston 16 is now connected to atmosphere. The energization of valve F therefore drives piston 16 to the left and moves the keps 13 inwardly thereby locking the cage A at the plant deck. With the keps in this locking position contact 36—36ᵇ of circuit controller K is closed and current flows from terminal B, through contact 36—36ᵇ, wire 76, and lamp 49 back to terminal C. The lamp 49 therefore constitutes an indicator which when lighted, informs the banksman that the keps have actually moved to their locking position. The closing of contact 38 of circuit controller K also completes the circuit for winding 18 of valve G. Ram R is therefore operated to project ram head 31 to the left as seen in Fig. 1. This movement of the ram may be utilized, as already suggested, to remove colliery tubs from the cage A.

In order to restore the apparatus to its original condition, the banksman must return lever 1 to its normal position. But in order to do this he must first energize magnet 83 of lock L'. This is accomplished by operating circuit controller Q, current then flowing from terminal B, through contact 41—41ᵇ of circuit controller Q, wire 71, contact 37 of circuit controller K, wires 72, 73 and 74, and magnet 83 of lock L', to terminal C. The energization of magnet 83 lifts the locking dog 81 of lock L' to disengage shoulder 82ᵃ of segment 82. Lever 1 may then be restored to its normal position. The banksman may then release circuit controller Q. The opening of reverse contact 62—62ᵃ of lever 1 interrupts the circuit for the ram valve G which thereupon becomes de-energized and allows fluid pressure from pipe 27 to move piston 26 to the right and withdraw the ram head 31 from the cage A. When the ram has returned to its fully retracted position the consequent closing of contact 34 of circuit controller Q completes the circuit for valve E. Valve F is now de-energized and so the energization of valve E actuates motor D to withdraw the keps 13. The resulting opening of contact 36—36ᵇ of circuit controller K de-energizes lamp 49. The closing of contact 36—36ᵃ of circuit controller K completes a circuit for lamp 48 from terminal B through contact 36—36ᵃ, wire 77, contact 33 of circuit controller J, wire 78, lamp 48 and back to terminal C. The lamp 48 is lighted only when the ram R is fully retracted and when the keps are withdrawn from beneath the cage A. The lamp therefore indicates to the banksman that the apparatus is in such condition that the hoisting cage may be lowered. The closing of contact 35 of circuit controller K completes the circuit for winding 44 of blinder device H and shield 42 is therefore lifted so that the banksman may operate push button 45.

It should be noticed that the shield 42 of device H is dropped as soon as lever 1 is moved from its normal position, and that this shield is lifted again only after the various parts of the apparatus have been placed in a condition which make it safe for the banksman to signal the engineman to lower the cage A.

If the cage A is conveying men instead of material, the operation is as follows: After the hoisting cage has reached its upper level the banksman reverses lever 6. The opening of normal contact 66 of this lever de-energizes the circuit for winding 44 of the blinder device H so that the shield of this device covers the push button 45. The opening of normal contact 55 of lever 6 de-energizes winding 18 of valve E. The closing of reverse contact 60 of lever 6 energizes valve F so that the motor D is actuated to project the keps 13 into their locking positions. Current also flows from terminal B, through reverse contact 79 of lever 6, wire 80, lamp 50 and back to terminal C. The lamp 50 therefore comprises an indicator which informs the banksman that the apparatus is now being controlled for the conveying of men. The closing of contact 36—36ᵃ of circuit controller K due to the operation of the keps 13 completes the circuit for lamp 49 which indicates that the keps are locking the cage at the plant deck.

It will be noticed that when the decking mechanism is controlled by lever 6 the keps are projected to lock the cage in its proper position in exactly the same manner as when the mechanism is controlled by lever 1, but that the ram is not projected into the cage.

In order to return the lever 6 to its normal position the banksman operates circuit controller Q. Current then flows from terminal B, through contact 41—41ᵇ of circuit controller Q, wire 71, contact 37 of circuit controller K and wires 72, 73 and 75 and magnet 83 of lock L⁶ to terminal C. The dog 81 is therefore lifted so that lever 6 may be returned to its normal position, the opening of reverse contact 79 of lever 6 de-energizing indicator 50. The banksman then releases circuit controller Q. The opening of reverse contact 60 of lever 6 de-energizes valve F, and the closing of normal contact 55 of lever 6 energizes winding 18 of valve E. Motor D is therefore actuated to withdraw the keps from beneath the cage A. Lamp 49 is thereupon extinguished, its circuit being open at contact 36—36ᵇ of circuit controller K. The closing of contact 35 of circuit controller K also completes the circuit for winding 44 of blinder device H so that push button 45 is now exposed to permit the banksman to signal the engineman that conditions are safe for the cage to be lowered.

From the foregoing description of the tappet locking mechanism of Figs. 2 and 3, it will be manifest that when lever 1 has been reversed to control the conveying of material, the tappet 7 prevents operation of lever 6. Similarly, when lever 6 is reversed to control the conveying of men, lever 1 is locked in its normal position. It is therefore impossible to project the ram into the cage when the cage is hoisting men.

Another feature of our invention is that after one of the levers 1 or 6 is moved to its reverse position, the electric lock L prevents the restoration of the lever to its normal position until the keps have been projected under the cage. The banksman must then operate circuit controller Q to release the lock for the lever and after the lever is restored to its normal position, the circuit controller Q must be released in order to complete, at contact 41—41ª thereon, the operating circuit for valve E by means of which the keps are withdrawn from the cage.

Although we have herein shown and described only one form of controlling apparatus for collieries embodying our invention, it is understood that various changes and modifications may be made therein within the scope of the appended claims without departing from the spirit and scope of our invention.

Having thus described our invention, what we claim is:

1. Controlling apparatus for collieries comprising a hoisting cage, decking mechanism co-operating with said cage, a first lever for controlling said decking mechanism when the hoisting cage is conveying material, and a second lever mechanically interlocked with said first lever for controlling said decking mechanism when the hoisting cage is conveying men.

2. Controlling apparatus for collieries comprising a hoisting cage, decking mechanism co-operating with said cage, a first lever for controlling said decking mechanism when the hoist is conveying material, a second lever for controlling a portion only of said decking mechanism when said hoist is conveying men, and a lock for preventing operation of either of said levers when the other is operated.

3. In combination, a hoisting cage, decking mechanism co-operating with said cage, two levers each having a normal position and each arranged when moved to its reverse position to actuate a different portion of said decking mechanism and a lock for preventing movement of either of said levers when the other is in its reverse position.

4. Controlling apparatus for collieries comprising a hoisting cage for conveying material and men, material handling mechanism co-operating with said cage, a first lever for controlling said material handling mechanism, a second lever, mechanism controlled by said second lever for locking said cage in position, and a lock for preventing operation of either of said levers when the other is operated.

5. Controlling apparatus for collieries comprising a hoisting cage, a first lever and a second lever each having a normal and a reverse position, material handling mechanism arranged to be actuated when one of said levers is moved to its reverse position, cage locking mechanism arranged to be operated when the other said lever is moved to its reverse position, and a lock for preventing movement of either lever to is reverse position unless the other lever occupies its normal position.

6. Controlling apparatus for collieries comprising a hoisting cage for conveying men and material at different times, decking mechanism associated with said cage, a first lever for controlling said decking mechanism when said cage is conveying men and arranged when operated to lock said cage in position, a second lever for controlling said decking mechanism when the cage is conveying material and arranged to move material in the cage, said levers being interlocked so that only one lever can be operated at a time.

7. Controlling apparatus for collieries comprising a hoisting cage, a lever having normal and reverse positions, means effective only when said lever is in the reverse position for locking said cage at the plant deck, and means for preventing return motion of said lever to its full normal position unless said cage is actually locked at the plant deck.

8. Controlling apparatus for collieries comprising a hoisting cage, a lever having normal and reverse positions, an electric lock arranged when de-energized to prevent movement of said lever to its full normal position, means effective only when said lever is in the reverse position for locking said cage at the plant deck, a manually operable circuit controller, and means controlled by said circuit controller for energizing said electric lock if said cage is actually locked at the plant desk.

9. Controlling apparatus for collieries comprising a hoisting cage, decking mechanism for co-operating with said cage, two separate levers for controlling said mechanism at different times, means for preventing the operation of either lever when the other is operated, and an indicator controlled by said decking mechanism.

10. Controlling apparatus for collieries comprising a hoisting cage, decking mechanism co-operating with said cage, a first lever for controlling said decking mechanism when the hoist is conveying material, a second lever for controlling a portion only of said decking mechanism when said hoist is conveying men, and a lock for preventing operation of either of said levers when the other is operated.

11. Controlling apparatus for collieries comprising a hoisting cage, a first lever and a second lever each having normal and reverse positions, locking mechanism operating when said first lever is in its reversed position to secure said cage at the plant deck, material handling mechanism arranged to occupy its operative position when said second lever is in its reverse position and a tappet for preventing movement of either said levers from its normal position unless the other lever is in its normal position.

12. Controlling apparatus for collieries comprising a hoisting cage, a first lever and a second lever each having a normal and a reverse position and interlocked to prevent movement of either lever from its normal position unless the other lever is in its normal position, means effective when either lever is in its reverse position for locking the cage at the plant deck, material handling mechanism controlled by one only of said levers, and means effective only when both said levers are in their normal positions and when said material handling mechanism is in its inoperative position for releasing said cage locking means.

13. Controlling apparatus for collieries comprising a hoisting cage, a first lever and a second lever each having a normal and a reverse position and interlocked to prevent movement of either lever from its normal position unless the other lever is in its normal position, means effective when either lever is in its reverse position for locking the cage at the plant deck, a manually operable push button, a signal controlled by said push button, and means for preventing operation of said push button unless said levers are both in their normal positions.

14. Controlling apparatus for collieries comprising a hoisting cage, a first lever and a second lever each having a normal and a reverse position and interlocked to prevent movement of either lever from its normal position unless the other lever is in its normal position, means effective when either lever is in its reverse position for locking the cage at the plant deck, a manually operable push button, a signal controlled by said push button, and means for preventing operation of said push button unless said cage locking means and said material handling mechanism are both in their ineffective positions.

15. Controlling apparatus for collieries comprising a hoisting cage, decking mechanism for co-operating with said cage, two separate levers for controlling said mechanism at different times, and means for preventing the operation of either lever when the other is operated.

In testimony whereof we affix our signatures.

DONALD F. BROWN.
FREDERICK J. RAYMER.